Patented July 9, 1935

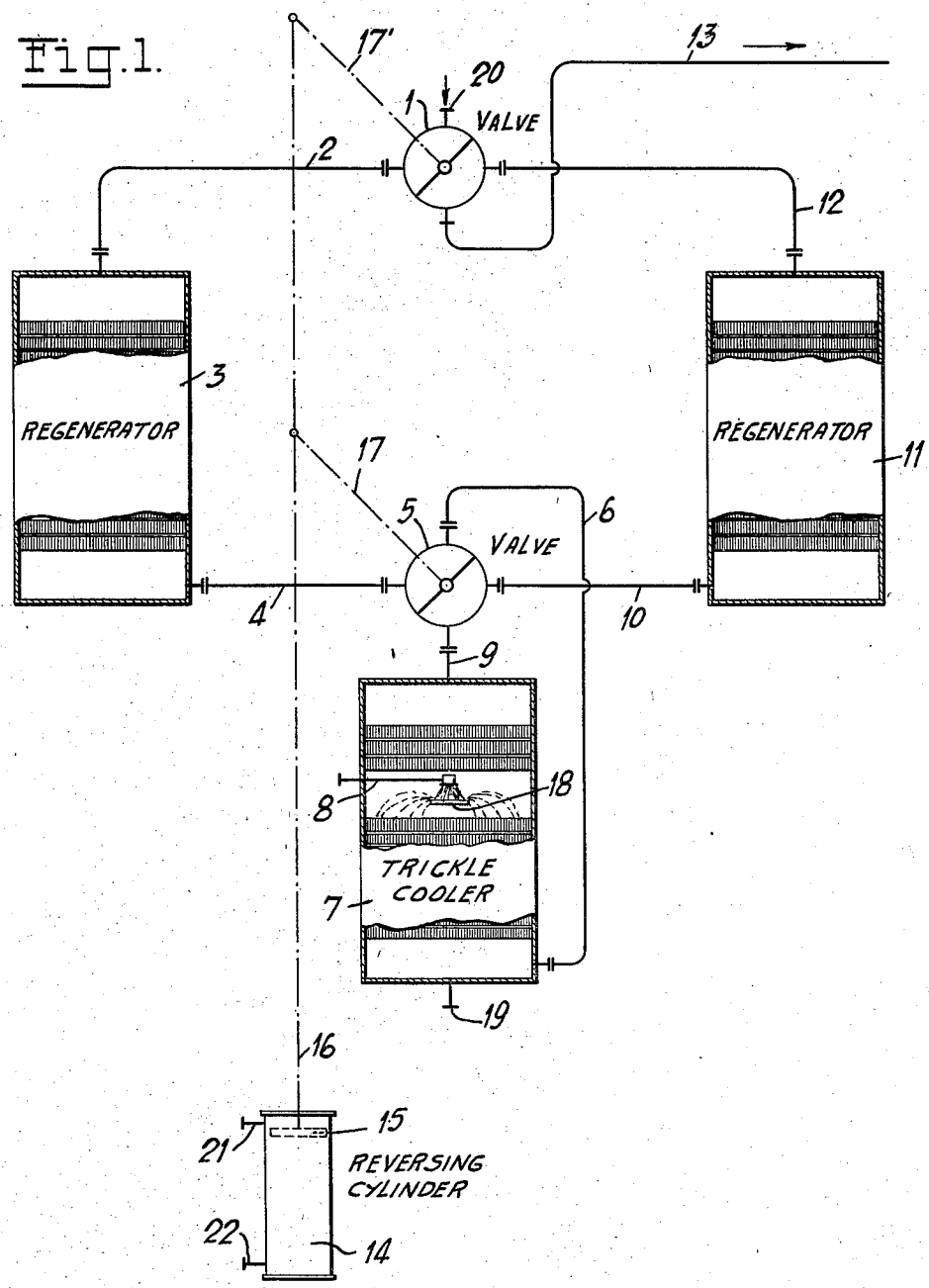

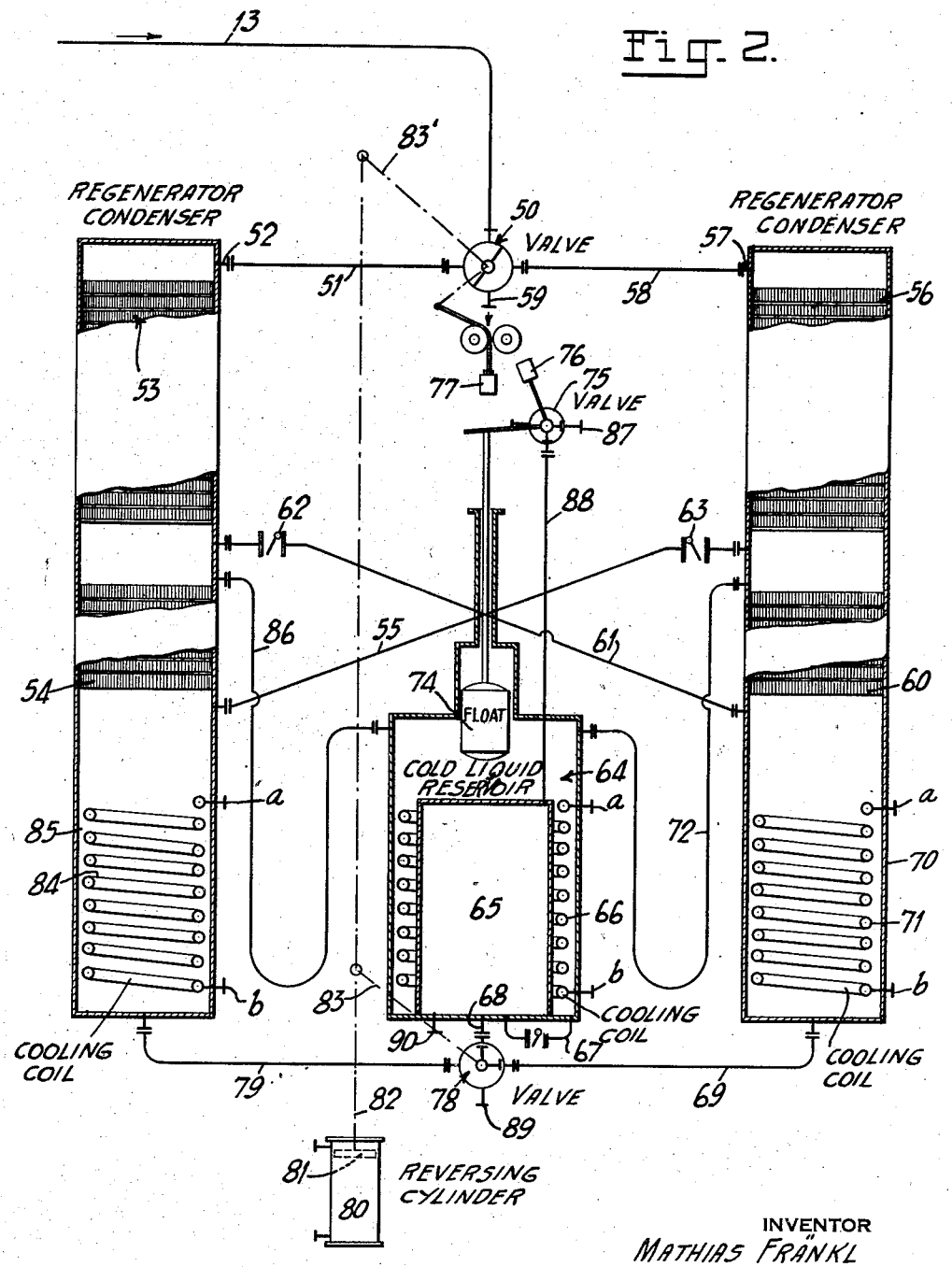

2,007,271

UNITED STATES PATENT OFFICE 2,007,271

PROCESS FOR THE SEPARATION OF CONSTITUENTS OF A GASEOUS MIXTURE

Mathias Fränkl, Augsburg, Germany, assignor to American Oxythermic Corporation, New York, N. Y., a corporation of Delaware Application September 23, 1932, Serial No. 634,522

13 Claims. (Cl. 62—175.5)

The invention relates to a process for the separation of constituents from a gaseous mixture and to an apparatus adapted for such separation. More particularly, it relates to the separation of water, naphthalene, etc., and benzene from a coke oven gas, and includes correlated improvements and discoveries whereby the separation of the constituents is enhanced.

It is an object of the invention to provide a process whereby constituents which are condensible at a higher temperature are separated prior to effecting removal of lower boiling constituents at a relatively much lower temperature.

Another object of the invention is to provide a process whereby constituents of a coke oven gas may be separated effectively, with facility and with a reduction in power requirement, hence economically on a commercial scale.

A further object is to provide a process in which constituents of a gaseous mixture are separated by a wet absorption method, in which regenerative cold exchange is effected with respect to ingoing and outgoing gaseous bodies and in which higher boiling constituents are first effectively removed, and then in a second stage lower boiling constituents are separated and absorbed in contact with a cold liquid in which the constituents are soluble.

An additional object of the invention is to effect separation of constituents from a coke oven gas by wet absorption method in accordance with which higher boiling constituents as water, naphthalene, etc. are separated at a temperature of about −5° C., and then benzene and lower boiling constituents are separated at a much lower temperature, e. g. about −60° C.

The provision of an apparatus comprising in combination regenerators, a trickle cooler and a cold liquid reservoir for effecting separation of constituents of a gaseous mixture in stages is also an object of the invention.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

The removal of constituents from gaseous mixtures, for example, benzene from coke oven gas which, because of the low partial pressures, can be removed by freezing only by a low or deep cooling of the gaseous mixture, may be more economically effected when such low partial pressure constituents are in admixture with higher boiling point materials, by first liquefying the materials condensible at a higher temperature, e. g., water and naphthalene, and then separating constituents that condense at low temperatures. When proceeding in this manner, the consumption of power for replacement of the cold requirement is materially reduced.

Taking for illustrative purposes, the separation of benzene from coke oven gas, it is to be noted that benzene does not begin to freeze out of the gas until a temperature of about −5° C. is reached. Further, it is only by cooling to about −60° C. that the benzene contained in the gas can be completely recovered. On the other hand, water vapor and naphthalene can be removed up to about 80% of their total content by a forecooling to about −5° C. The entire amount of cold consumed during the condensation of these vapors must be replaced. This replacement of cold is, however, more expensive the lower the temperature required for the separation. If the water vapor, the naphthalene and the benzene are frozen out of the gas in a single step, then the replacement of cold must take place at −60° C. If, however, the water vapor, naphthalene, etc. are first removed, then about three-fifths of the cold requirement can be replaced at −5° C. At −60° C. only 600 calories can at best be produced with an energy expenditure of 1 H. P. per hour, whereas at −5° C. the output rises to about 4,000 calories. In addition, at −5° C. the cold can be produced entirely by vaporization of a refrigerant which has been liquefied under pressure, i. e., by means of an ammonia refrigerating machine, whereas at −60° C. it is necessary to produce the cold by detensioning a compressed gas, as compressed air, which it will be realized greatly increases the cost of the plant.

In the practice of the invention, which will be described with particular reference to the separation of water, naphthalene and benzene from a coke oven gas for purposes of illustration, it being understood that the invention is not limited thereto, the removal of water vapor and naphthalene may be effected in a first stage of the process by cooling the gaseous mixture by means of a regenerator, and then passing the thus cooled mixture through a trickle cooler in which residual water vapor and naphthalene are removed, and finally passing the cooled and depleted gaseous mixture out through another regenerator to which its cold is imparted. The gaseous medium, free from water vapor and naphthalene, and rewarmed by its passage through the second regenerator, is then conducted to the second stage of the process in which the benzene is separated by passing the mixture through a regenerator-condenser in which the gaseous mixture is cooled to a temperature of about —60° C. with deposition of the benzene content in the regenerator and condenser, and then conducting the benzene-free gaseous mixture out through a second regenerator-condenser. The regenerator-condensers consist of an unitary structure having a regenerator section and a condenser section. The gaseous mixture on passing out through the second regenerator-condenser flows only through the regenerator portion.

In the first stage of the process, wherein water and naphthalene are removed, the temperature is about —5° C., and the cooling of the liquid, e. g., brine or lye, in the trickle cooler may be accomplished by means of an ammonia refrigerating machine. The water vapor and naphthalene are effectively removed by the trickle cooler, and the cold acquired by the gaseous mixture is recovered during its passage through the outgoing regenerator. During this stage, water and naphthalene deposit upon the filling elements, e. g., corrugated metallic strips in the regenerator. The removal of such deposit is effected by continuing the flow until it has been vaporized and the filling consequently somewhat warmed.

The removal of the benzene is effected by a freezing out or deposition thereof within the condenser section of the regenerator-condensers, and the cold in the residual gas is re-claimed during its outflow through a second regenerator. The cooling of the condenser section of the regenerator-condenser is occasioned by a suitable liquid, as toluene or alcohol, which is conveyed to the condenser and caused to flow past and over the condenser sections, whereby the deposited benzene is removed by solution and the condenser sections cooled to the operating temperature. The water and naphthalene content of the gas, as indicated, is taken up by the refrigerated brine or lye, and the benzene deposited by the toluene or alcohol. The increased water content of the brine may be removed by evaporation and the naphthalene separated therefrom by filtration. The benzene may be recovered from the toluene or alcohol either by a further lowering of the temperature, or by rectification.

The benzene freezes out of the gaseous mixture only at temperatures of —5° C. and lower. Accordingly, the forecooling and dehydration may be carried out at temperatures down to this point and such procedure constitutes the first stage or part of the process. The water vapor may thus be separated to an extent of about 3 grams per cubic meter, while the benzene content may amount to about 25 grams per cubic meter.

In the second stage or part of the process, cooling is carried to about —60° C. whereupon benzene and any residual higher boiling constituent, as water, are separated. The benzene dissolves in the toluene, whereas any residual water remains therein either as finally distributed snow or as floating particles until the toluene is warmed, or it may deposit as a semi-liquid which can be, if desired, drawn off. Inasmuch as the water content amounts to only about 15% of the benzene content and, further, at most to about 1% of the quantity of toluene, the withdrawal of liquid from the condenser is not necessary. This is the case since the small content of water does not produce any difficulties, especially in view of the fact that a part of the toluene is continuously drawn off and regenerated to recover the benzene. If, however, alcohol is used instead of toluene, then the water also goes into solution and will require a rectification treatment for its separation.

The consumption of cold in the first stage of the process down to about —5° C., that is, removal of water and naphthalene, may be covered by re-cooling the lye or brine by means of an ammonia refrigerating machine and, in the second stage, that is, about down to —60° C. for separation of benzene, by means of, for example, cold air which may be produced by detensioning compressed air in a suitable expansion engine.

An apparatus in which the invention may be practiced is shown in Figs. 1 and 2 of the drawings. Figure 1 represents the first stage of the process, in which water and naphthalene may be removed, and Figure 2 represents the second stage of the process, in which benzene may be separated. The apparatus is shown diagrammatically upon the drawings, and the process will now be more particularly described in conjunction with a description of the apparatus.

The apparatus comprises in combination an assembly comprising a plurality of regenerators in combination with a trickle cooler. This assembly is also provided with reversing valves, a suitable means for introducing the cooling liquid into the trickle cooler, a compressed air engine, or reversing cylinders, for periodically operating the reversing valves, and conduits connecting the valves with the regenerators and the regenerators with the trickle cooler in operative relation.

The foregoing assembly is in combination with another assembly comprising a plurality of regenerator-condensers in combination with a cold liquid reservoir. This assembly is provided with reversing valves, means for cooling the liquid in the cold liquid reservoir to the desired temperature, a compressed air engine, or reversing cylinder, for operating the reversing valves, conduits connecting the regenerators with each other and with a reversing valve, and conduits connecting the cold liquid reservoir with the condenser sections of the regenerator-condensers, all of such connecting conduits being positioned in operative relation.

With respect to Figure 2, it will be realized that instead of constructing the regenerators and condensers as a single unit, as therein shown, the regenerators and condensers may be as separate units. However, the construction shown in Figure 2 is more economical, both from the standpoint of construction and operation.

In carrying out the invention in the apparatus shown, a gaseous mixture, for illustrative purposes coke oven gas, may be introduced into the system by the inlet 20 of reversing valve 1. Thence the gaseous mixture passes by a pipe 2 to a regenerator 3 in which it is cooled, and passes therefrom through a pipe 4 to a reversing valve 5 and thence by a conduit 6 to the bottom of a trickle cooler 7. The gas in passing through the regenerator is cooled and deposits a part of its water and naphthalene content, and, during its passage through the trickle cooler, the removal of water and naphthalene by contact with a cold brine or lye is substantially completely effected.

The brine which has been cooled, for example by an ammonia refrigerating machine (not shown) is introduced into the trickle cooler by a pipe 8 from which it is sprayed upon a baffle or distributing plate 18, and thence flows downward contacting with the upwardly rising gaseous mixture. It leaves the cooler at the outlet 19. The gaseous mixture, free from water vapor and naphthalene, passes from the trickle cooler to the reversing valve 5 through a pipe 9, and from the reversing valve through a pipe 10 to another or second regenerator 11 to the filling of which, preferably strips of corrugated sheet metal, the cold of the gas is imparted. The warm gas passes from this regenerator by a pipe 12 to the reversing valve 1.

The flow of gas in this described manner continues until the first regenerator 3 is sufficiently warm to remove the initially deposited water and naphthalene. When this condition is reached, the direction of flow is reversed by means of the compressed air engine 14 having inlet and outlet connections 21 and 22 and an operative piston member 15 which is connected by means of a rod 16 and the arms 17 and 17' with the valves 1 and 5. Following the reversal, the ingoing gas enters regenerator 11, passes through trickle cooler 7, and the cold is absorbed from the outflowing gas mixture in the regenerator 3.

The removal of water vapor and naphthalene having been effected in the foregoing manner, the warmed gaseous mixture containing benzene as the principal constituent whose recovery is desired, passes from the reversing valve 1 through conduit 13 to the regenerator-condenser assembly in which the benzene is removed. The gas entering by reversing valve 50 passes therefrom through a pipe 51 and connection 52 into the regenerator 53. The warm gas passes downward through the cold regenerator section 53 and the condenser section 54 immediately below. The cold gas, which has deposited its benzene content in the regenerator-condenser in view of the low temperature of about −60° C., then is conducted by a pipe 55 through a flap valve 63 into the base of the regenerator section 56. The outgoing gas gives up its cold to the filling in this regenerator section, and leaves it at connection 57 through a conduit 58 leading to the reversing valve 50 from which it is discharged by the outlet 59. During the passage of the benzene-laden gas through the regenerator, a portion of the benzene is deposited upon the filling, whereas the remainder is deposited upon the sections in the condenser. Passage of the gas is continued until all of the benzene deposited in the regenerator has been revaporized and redeposited upon the sections in the condenser, whereupon the flow is reversed, so that the gas enters the regenerator 56, passes down through the condenser 60 and by means of the conduit 61 and valve 62 is introduced at the base of the regenerator 53.

In order to cool the condenser sections, a liquid, as toluene, or alcohol contained in a cold liquid reservoir 64 is forced from an inner container 65 by means of compressed air, introduced through the valve 75 and pipe 88, through a valve 78 connected to the reservoir by means of a pipe 68, into the respective sections during that period at which the outgoing gas is giving up its cold to the regenerator section. Thus, when the gas is flowing in through regenerator 53 and condenser 54 and out through regenerator 56, the refrigerating liquid is forced from the cold liquid reservoir 64 through pipe 68, valve 78 and conduit 69 into the condenser sections 70 and 60. The cold liquid is forced in until the condenser section 60 is filled and the liquid flows therefrom through a conduit 72 back into the cold liquid reservoir and until the height of liquid in the reservoir actuates the plunger 74 which in turn cuts off the supply of compressed air through the valve 75 and permits a release of the air pressure therethrough, whereupon the cold liquid returns to the reservoir and the condenser section 60 is free therefrom. The liquid remains in the lower condenser section 70 and is cooled therein by any suitable cooling medium which is caused to circulate through the coil 71 having inlet and outlet connections (a) and (b). When the flow of gas is reversed and the outflow is through regenerator 53, the condenser sections 85 and 54 are cooled by the cooling liquid from the cold liquid reservoir, forced thereinto through pipe 79 and flowing therefrom back to the reservoir through a pipe 86. The flow is discontinued and cooling liquid returned to the reservoir in the same manner as has just been described.

The cooling liquid serves to remove the benzene and any residual water or other vapors passing from the first stage, and also to cool the condenser sections to the operative temperature of about −260° C. The cooling is required inasmuch as the flow of gas in a given direction is continued until the regenerator filling has been warmed sufficiently to cause revaporization of any deposited constituent. The accomplishment of this result is attended by a partial warming of the upper part of the condenser section, the benzene revaporized being deposited within the condenser, more particularly upon the lower colder sections thereof. The cooling of the upper part of the condenser sections by the liquid causes a warming of such liquid and, in order to replace the cold or to furnish this cold requirement, the coils 84 and 71 are provided in the base of the regenerator-condensers and a similar coil 66 is provided in the cold liquid reservoir 64. Through these coils, by means of the connections (a) and (b), a suitable refrigerating or cooling medium may be introduced in order to restore the cold given up by the liquid to the warmer upper part of the condensers. The refrigerating medium may be a gas, such as air, compressed and detensioned to give the desired cooling effect with a lowering of temperature to about −60° C. The various valves, as reversing valves 50 and 78, are operated by a compressed air engine 80 having an operative piston member 81 connected through a rod 82 and arms 83 and 83' with the reversing valves 50 and 78. The compressed air valve 75 is operated by means of the weight 77, which throws the member 76 of the valve 75 to permit the inflow of compressed air when such pressure is released. This compressed air flow is cut off and the pressure within the cold liquid reservoir released by a functioning of the float 74 which is operatively connected with the valve 75.

More particularly, the operation of the compressed air valve is as follows: liquid returns from the condensers to the outer chamber 64 of the reservoir. This liquid occasions rise of the float 74 which, through such rise, actuates the compressed air valve. When the liquid has risen sufficiently the weight 76 passes beyond the vertical point, and due to force of gravity, completes the operation of the valve by throwing it into the position in which the compressed air is released. The float is then in an upward position and out of operative relation with respect to subsequent rise of liquid in the chamber 64. The float is returned to its lower or operative position, and the valve 78 to that position which permits the introduction of compressed air by means of the weight 77. This weight is lowered and again raised when the reversing valve 50 is changed. The lowering of the weight 77 causes it to contact and rest upon the upper part of the float, thus forcing it down and throws the weight 76 beyond the vertical so that the continued movement of this weight effects a change in the valve 77 to again permit the introduction of compressed air.

The removal of benzene taken up by the cold liquid may be carried out by withdrawing liquid from the reservoir through the connection 90 and separating the benzene by rectification. The cold liquid in the lower part of the regenerator-condensers may be removed when desired by means of the connection 89 upon the valve 78 and a transfer of liquid may be made from the outer chamber of the cold reservoir to the inner chamber 65 through the valved conduit 67.

The foregoing procedure provides a method whereby water, naphthalene and benzene may be efficiently separated from a coke oven gas by a two-stage process, the first bringing about separation of water and naphthalene by absorption in a refrigerated brine from which the water may be removed and the naphthalene recovered, and the second stage effecting removal of benzene by cooling to a temperature of about −60° C., taking up the benzene in a cold liquid as toluene, and obtaining the benzene from such liquid by rectification. The first stage of the process, removing only higher boiling constituents, does not require cooling other than to a moderately low temperature, and inasmuch as it thus becomes necessary to have a much lower temperature for the removal of only lower boiling constituents, the requirement for cold replacement is materially lessened and the process can, accordingly, be carried out economically both from the standpoint of continued operation and initial plant cost.

The process of the invention whereby readily condensible constituents are removed prior to the removal of the lower boiling constituents, whereby the power requirement for replacement of cold is decreased utilizing wet cooler operation in combination with regenerators for cold exchange operating with periodic reversal of flow, it will be realized, is not limited to the removal of water, naphthalene and benzene from coke oven gases or to the particular conditions set forth in the foregoing detailed description. It is to be understood that the process is applicable also to the treatment of other gaseous mixtures containing constituents which condense at higher and at lower temperatures, for example, natural gas, flue gases, gases arising from the destructive distillation of carbon-containing materials, as wood, etc.

Since certain changes in carrying out the above process and in the constructions set forth which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for the separation of constituents of a gaseous mixture, which comprises cooling said gaseous mixture by contact with chilled surfaces, contacting with a trickling refrigerated liquid whereby higher boiling constituents are removed, warming by contact with regenerative surfaces which subsequently serve to cool ingoing gaseous mixture, and then further cooling by contact with chilled surfaces to separate lower boiling constituents and absorbing the thus separated constituents in a cold organic liquid.

2. A process for the separation of constituents of a gaseous mixture, which comprises cooling said gaseous mixture in a regenerator, contacting with a trickling refrigerated brine whereby higher boiling constituents are removed, rewarming by passing through a second regenerator and then further cooling in a regenerator and a condenser whereby lower boiling constituents are separated and deposited in the condenser, absorbing the thus separated constituents in a cold liquid, and conducting outgoing gaseous mixture through another regenerator wherein the cold content of the outgoing gaseous mixture is absorbed.

3. A process for the separation of constituents of a gaseous mixture, which comprises cooling said gaseous mixture in a regenerator, contacting with a trickling refrigerated brine whereby higher boiling constituents are removed, rewarming by passing through a second regenerator and then further cooling in a regenerator and a condenser whereby lower boiling constituents are separated and deposited in the condenser, absorbing the thus separated constituents in a cold liquid, conducting outgoing gaseous mixture through another regenerator wherein the cold content of the outgoing gaseous mixture is absorbed, and periodically reversing the flow of gaseous mixture through the first and second mentioned regenerators and through the last mentioned regenerators and condensers.

4. A process for the separation of water, naphthalene and benzene from a coke oven gas, which comprises cooling said gaseous mixture in a regenerator, contacting the cooled gas with a trickling refrigerated brine at a temperature of about −5° C. whereby water and naphthalene are taken up by the brine, warming to about atmospheric temperature by conducting the cold gas through a second regenerator and then again cooling in a regenerator and a condenser at a temperature of about −60° C. whereby benzene is deposited in said condenser, absorbing the deposited benzene in toluene cooled to a temperature of about −60° C., and conducting outgoing benzene-free gaseous mixture through a regenerator wherein its cold is absorbed.

5. A process for the separation of constituents of a gaseous mixture, which comprises first removing higher boiling constituents by cooling said gaseous mixture in a regenerator and contacting with a trickling refrigerated liquid and then further cooling the gas in a regenerator and a condenser whereby lower boiling constituents are removed by deposition in said condenser, and absorbing such lower boiling constituents in a cold organic liquid.

6. A process for the separation of constituents of a gaseous mixture, which comprises separating water, naphthalene and benzene from a coke oven gas by first removing water and naphthalene by cooling in a regenerator and contacting with a trickling brine at a temperature of about −5° C., and then further cooling to a temperature of about −60° C. whereby benzene is separated out, and absorbing the separated benzene in toluene at a temperature of about −60° C.

7. An apparatus for separating constituents of a gaseous mixture, which comprises the combination of an assembly comprising in combination a plurality of regenerators, a trickle cooler in communication with said regenerators, means for admitting a refrigerated liquid to said trickle cooler, connections between said regenerators and said trickle cooler in operative relation, with an assembly comprising in combination a plurality of interconnected regenerators and condensers, a cold liquid reservoir, conduits for conducting a gaseous mixture into and out of said regenerators and condensers and from the base of said condensers to the base of said regenerators, conduits connecting the condensers with the cold liquid reservoir, and a conduit connecting a regenerator of said first assembly with a regenerator of said second assembly whereby gaseous mixture is conducted from one assembly to the other.

8. An apparatus for separating constituents of a gaseous mixture, which comprises the combination of an assembly comprising in combination a plurality of regenerators, a trickle cooler in communication with said regenerators, means for admitting a refrigerated liquid to said trickle cooler, connections between said regenerators and said trickle cooler in operative relation, with an assembly comprising in combination a plurality of interconnected regenerators and condensers, a cold liquid reservoir, conduits for conducting a gaseous mixture into and out of said regenerators and condensers and from the base of said condensers to the base of said regenerators, conduits connecting the condensers with the cold liquid reservoir, means in said cold liquid reservoir for cooling the liquid contents, means in the base of said condensers for introducing a cooling medium to effect indirect cooling thereof and a conduit connecting a regenerator of said first assembly with a regenerator of said second assembly whereby gaseous mixture is conducted from one assembly to the other.

9. An apparatus for separating constituents of a gaseous mixture, which comprises the combination of an assembly comprising in combination a plurality of regenerators, a trickle cooler in communication with said regenerators, means for admitting a refrigerated liquid to said trickle cooler, connections between said regenerators and said trickle cooler in operative relation, with an assembly comprising in combination a plurality of interconnected regenerators and condensers, a cold liquid reservoir, means in communication with said reservoir for exerting a pressure on the contents thereof, conduits for conducting a gaseous mixture into and out of said regenerators and condensers and from the base of said condensers to the base of said regenerators, conduits connecting the condensers with the cold liquid reservoir, means in said cold liquid reservoir for cooling the liquid contents, means in the base of said condensers for introducing a cooling medium to effect indirect cooling thereof and a conduit connecting a regenerator of said first assembly with a regenerator of said second assembly whereby gaseous mixture is conducted from one assembly to the other.

10. An apparatus for separating constituents of a gaseous mixture, which comprises the combination of an assembly comprising in combination a plurality of regenerators, a trickle cooler in communication with said regenerators, means for admitting a refrigerated liquid to said trickle cooler, connections between said regenerators and said trickle cooler in operative relation, with an assembly comprising in combination a plurality of interconnected regenerators and condensers, a cold liquid reservoir, means in communication with said reservoir for exerting a pressure on the contents thereof, conduits for conducting a gaseous mixture into and out of said regenerators and condensers and from the base of said condensers to the base of said regenerators, conduits connecting the condensers with the cold liquid reservoir, means in said cold liquid reservoir for cooling the liquid contents, means in the base of said condensers for introducing a cooling medium to effect indirect cooling thereof, reversing valves connected with the regenerators in the first and in the second mentioned assemblies whereby the flow therethrough may be periodically and alternately reversed and a conduit connecting a regenerator of said first assembly with a regenerator of said second assembly whereby gaseous mixture is conducted from one assembly to the other.

11. An apparatus for separating constituents of a gaseous mixture, which comprises the combination of an assembly comprising in combination a plurality of regenerators, a trickle cooler in operatives communication by means of conduits with said regenerators, with an assembly, comprising in combination a plurality of interconnected regenerators and condensers, a cold liquid reservoir in communication with said condensers, means for introducing and withdrawing gas from the assemblies, a conduit operatively connecting said assemblies, and conduits operatively connecting the various elements of said assemblies.

12. A process for the separation of constituents of a gaseous mixture which comprises cooling said gas mixture in a cold yielding zone, contacting with a refrigerated liquid whereby higher boiling constituents are removed, then warming by passing through a cold absorbing zone in which gaseous mixture is subsequently cooled, further cooling in another cold yielding zone wherein lower boiling constituents are separated by deposition, and subsequently absorbing said separated constituents in a cold liquid.

13. A process for the separation of constituents of a gaseous mixture which comprises cooling said gaseous mixture by passing through a cold yielding zone, contacting with a trickling refrigerated liquid whereby higher boiling constituents are removed, then warming by passing through a cold absorbing zone in which gaseous mixture is subsequently cooled, further cooling in another cold yielding zone wherein lower boiling constituents are separated by deposition, and absorbing such separated constituents in a cold organic liquid.

MATHIAS FRÄNKL.